Dec. 23, 1969     J. MERLAN     3,485,510
SELF-PROPELLING AND STEERING ATTACHMENT
APPARATUS FOR A WHEEL CHAIR
Filed Oct. 16, 1967     2 Sheets-Sheet 1
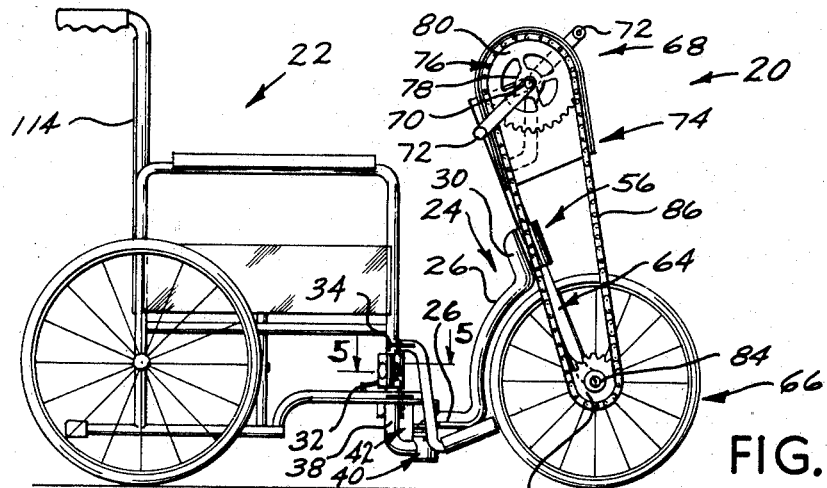
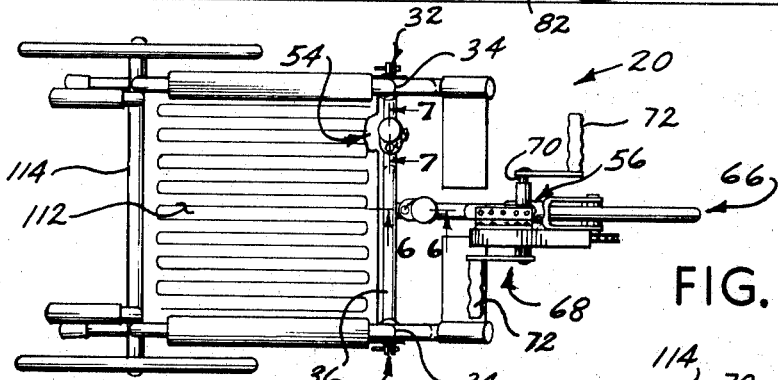
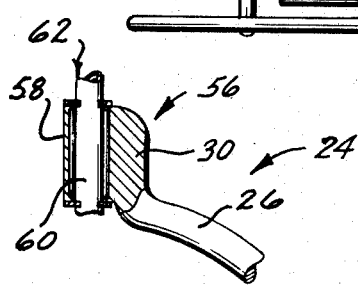
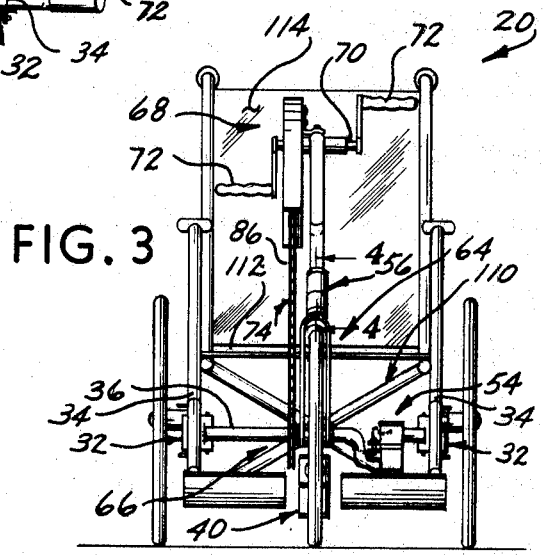
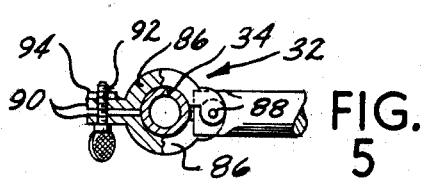
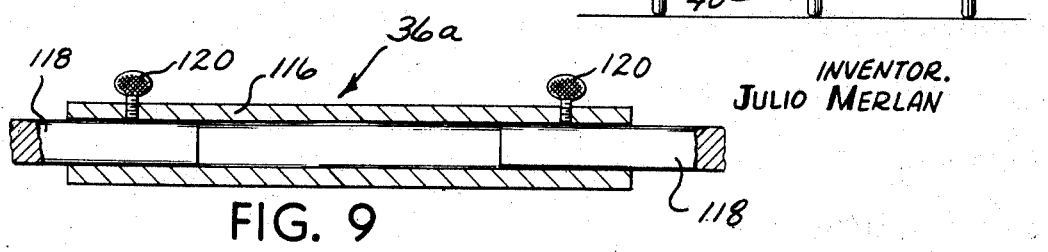
INVENTOR.
JULIO MERLAN Dec. 23, 1969   J. MERLAN   3,485,510
SELF-PROPELLING AND STEERING ATTACHMENT
APPARATUS FOR A WHEEL CHAIR
Filed Oct. 16, 1967   2 Sheets-Sheet 2
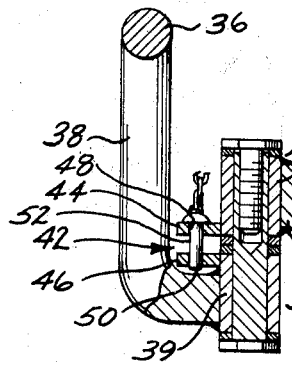
FIG. 6
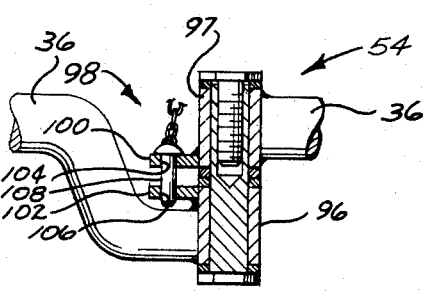
FIG. 7
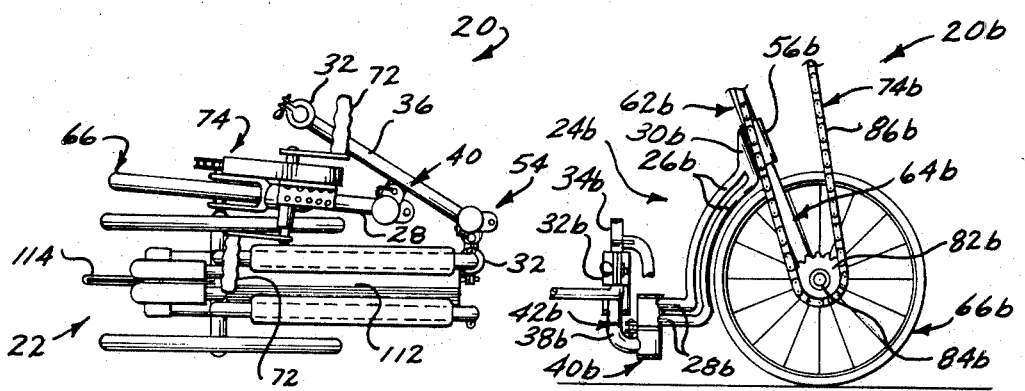
FIG. 8   FIG. 10
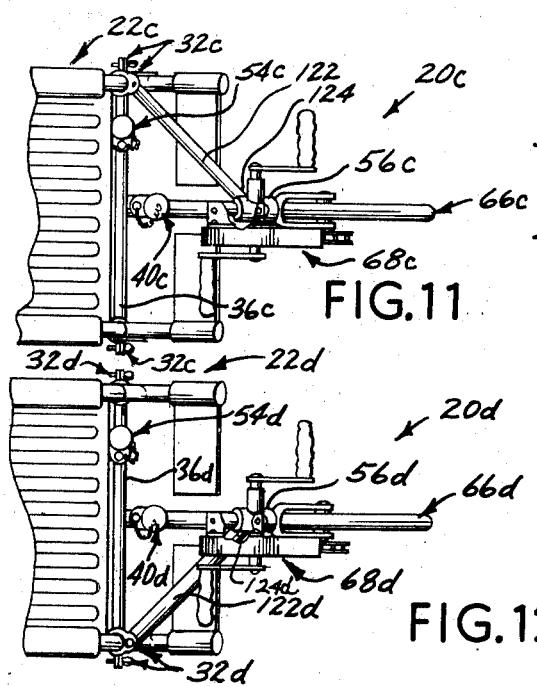
FIG. 11
FIG. 12
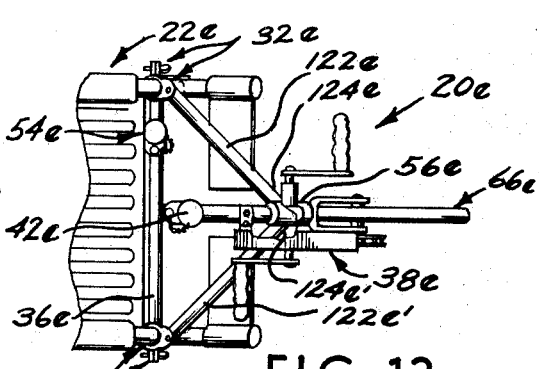
FIG. 13
INVENTOR.
JULIO MERLAN

United States Patent Office 3,485,510
Patented Dec. 23, 1969

3,485,510
SELF-PROPELLING AND STEERING ATTACHMENT APPARATUS FOR A WHEEL CHAIR
Julio Merlan, 13218 Barbara Ann St.,
North Hollywood, Calif. 91605
Filed Oct. 16, 1967, Ser. No. 675,525
Int. Cl. B62b *11/00;* B62m *1/14*
U.S. Cl. 280—250                                4 Claims

ABSTRACT OF THE DISCLOSURE

The specification discloses a self-propelling and steering attachment apparatus for a wheel chair which, in one preferred exemplary and non-specifically limiting form of the invention, is disclosed as comprising a pre-existing, conventional, collapsible and foldable type of wheel chair.

---

Generally speaking, the present invention comprises self-propelling and self-steering apparatus for a wheel chair which, in one preferred form, may be separate auxiliary attachment apparatus adapted to be very quickly and easily attached in an extremely structurally strong manner with respect to a conventional pre-existing wheel chair which may be of either the rigid type or the collapsible, foldable type. However, it should be noted that the self-propelling and self-steering apparatus may, in certain forms of the invention, be initially provided in association with a wheel chair. Broadly speaking, the apparatus includes framework means having a rear portion rigidly connected or controllably connectible and disconnectible with respect to a front frame portion of a wheel chair, with said framework means having a forward portion pivotally mounting a steering post member carrying a steering and propelling wheel at the bottom thereof and crank means at the top thereof for controllably propelling and steering same by way of power transmission means effectively coupled therebetween and which, in certain forms of the invention, may be of the type adapted to forcibly apply propelling torque to the wheel and rotate it in one manner, forcibly brake the wheel when torque is applied thereto in a different manner (usually an opposite manner) and, in certain forms of the invention, also adapted to allow a free-wheeling, effective disconnection between the propelling means (usually hand-operable offset crank means) and the wheel means so that the entire device may coast or be capable of being freely moved by exterior force applied thereto or by the fact that the wheel chair itself may be of the power-driven type wherein one or the other or both of the rear wheels of the wheel chair is driven by an appropriate motor means.

In the preferred auxiliary attachment form of the invention referred to above, the rear end of the auxiliary framework means thereof is provided with an engagement means of a quick connect and disconnect positive locking type which allows the auxiliary framework means of the attachment device to be very quickly and easily attached to front frame portions of a conventional pre-existing wheel chair in a structurally strong manner, and which also allows the complete auxiliary device to be just as quickly and easily removed therefrom when the wheel chair is to be used in a conventional manner without the auxiliary self-propelling and steering apparatus of the present invention.

Additionally, in a preferred form of the invention, a pair of pivot means and means for effectively overriding and immobilizing same are provided to facilitate the complete folding and collapsing of the entire composite apparatus when the auxiliary attachment apparatus of the present invention is in mounted relationship on a collapsible type of wheel chair. Of course, this latter feature may be eliminated when the device is mounted on a non-collapsible wheel chair.

With the above points in mind, it is an object of the present invention to provide a novel self-propelling and steering apparatus for a wheel chair which enables a person sitting in a wheel chair to easily propel and steer the wheel chair—in other words, to entirely operate and control the wheel chair without the necessity of any external help.

It is a further object of the present invention to provide apparatus of the character referred to in the preceding object which is of an auxiliary attachment type adapted to be quickly and easily mounted in a structurally strong manner on a conventional pre-existing wheel chair which, in one preferred form, may be of the foldable, collapsible type, although not specifically so limited in all forms of the invention.

It is a further object of the present invention to provide apparatus of the character set forth in the preceding object wherein the auxiliary attachment apparatus includes pivot means and controllably operable overriding and immobilizing means therefor which facilitate the complete collapsing of the auxiliary attachment apparatus, along with the collapsing and folding of a conventional pre-existing wheel chair, when the two structures have been joined together to comprise the complete combination form of the invention.

It is a further object of the present invention to provide apparatus having any or all of the advantages referred to herein and including any or all of the features referred to herein, generically and/or specifically, and individually or in combination, and which is of extremely simple, inexpensive, easily mountable and dismountable construction suitable for manufacture and mounting as original equipment or for manufacture and sale as auxiliary equipment for simple and easy mounting and dismounting with respect to a pre-existing wheel chair of either the rigid or collapsible, foldable type, and which is of relatively simple construction requiring a minimum of tooling and, therefore, of capital costs, and which is also adapted for production at a relatively low cost per unit, whereby to facilitate widespread manufacture, sale, and use of the invention for the purposes outlined herein.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

FIG. 1 is a side elevational view of one exemplary form of the present invention shown in mounted, operative relationship with respect to a wheel chair which is illustrated for exemplary and non-specifically-limiting purposes as comprising a conventional type of collapsible, foldable wheel chair which has had the front casters or wheels removed in this view.

FIG. 2 is a top plan view of the apparatus of FIG. 1.

FIG. 3 is a front elevational view of the apparatus of FIG. 1.

FIG. 4 is an enlarged fragmentary view, taken substantially along the plane and in the direction indicated by the arrows 4—4 of FIG. 3.

FIG. 5 is a view taken substantially along the plane and 3,485,510

3 in the direction indicated by the arrows 5—5 of FIG. 1 and illustrates a representative one of the two quick connect and disconnect positive locking engagement means for connecting rear ends of the auxiliary framework means of the self-propelling and steering apparatus of the present invention with respect to corresponding upstanding arm rest supporting frame portions of the wheel chair in an easily attachable and detachable manner and also in a manner which allows easy effective collapsing and folding of the composite structure for ready portability and/or storage when desired.

FIG. 6 is an enlarged, fragmentary, sectional view taken substantially along the plane and in the direction indicated by the arrows 6—6 of FIG. 2 and illustrates a first one of two controllably lockable pivot means comprising part of the auxiliary framework means and adapted to normally be locked and non-pivotal when the device is in mounted, operative relationship with respect to a wheel chair but which is adapted to be temporarily unlocked and rendered freely pivotal when the entire composite apparatus is to be collapsed or folded for portability or storage.

FIG. 7 is a fragmentary, enlarged, sectional view taken substantially along the plane and in the direction indicated by the arrows 7—7 of FIG. 2 and illustrates a second one of the two controllably lockable pivot means referred to above and comprising part of the auxiliary framework means and adapted to normally be locked and non-pivotal when the device is in mounted, operative relationship with respect to a wheel chair, but which is adapted to be temporarily unlocked and rendered freely pivotal when the entire composite apparatus is to be collapsed or folded for portability or storage.

FIG. 8 is a top plan view, generally similar to FIG. 2, but illustrates the composite apparatus after the normally immobilized first and second pivot means best shown in FIGS. 6 and 7 have been effectively unlocked and rendered pivotal, thus allowing the entire device to be folded and collapsed into the position shown in FIG. 8 where the complete device is much more compact and effectively compressed to facilitate easy portability and/or storage thereof until it is to be subsequently unfolded and placed in fully operative position for use again.

FIG. 9 is a fragmentary view, taken substantially on the same plane and in the same direction as that indicated by the arrows 7—7 of FIG. 2, but is centrally positioned rather than being offset to one side as in the case of FIG. 7, and, furthermore, this view illustrates a slight modification of the invention.

FIG. 10 is a fragmentary view illustrating a part of a modified form of the rearwardly and downwardly directed portion of the auxiliary framework means for spacedly connecting the front steering wheel means of the self-propelling and steering attachment apparatus of the present invention with respect to the front frame portions of the wheel chair in an extremely structurally strong and substantially non-deflectable manner.

FIG. 11 is a fragmentary top plan view generally similar to a portion of FIG. 2, but illustrates a slight modification of the invention, and is taken at a level below the crankshaft means and the pair of cranks so that the front end pivotal connection of the newly added rigidifying auxiliary support arm of the framework means can be clearly seen.

FIG. 12 is a view generally similar to FIG. 11, but illustrates an alternate arrangement.

FIG. 13 is a fragmentary view generally similar to FIGS. 11 and 12, but illustrates a further variation thereof.

Generally speaking, the self-propelling and self-steering apparatus of the present invention is illustrated in one particular exemplary and non-specifically limiting variation thereof in the first form of the invention shown in FIGS. 1–8, inclusive, wherein said apparatus is generally designated by the reference numeral 20 and is positioned

4 forwardly of a wheel chair, generally designated by the reference numeral 22.

In the exemplary first form of the invention illustrated, the wheel chair 22 is of a conventional, pre-existing, collapsible, foldable type, although the invention is not specifically limited thereto. Also, in the exemplary first form of the invention illustrated, the self-propelling and self-steering apparatus, generally designated by the reference numeral 20, is of what might be termed an auxiliary or attachment type adapted to be quickly and easily attached in a rigid, structurally strong manner with respect to the wheel chair 22 and to be just as easily and just as quickly detached therefrom when desired. However, it should be noted that the invention is not specifically so limited, and the self-propelling and self-steering apparatus, one exemplary form of which is generally designated at 20, may be initially provided in mounted, operative, associated relationship with respect to a wheel chair, one form of which is generally designated at 22.

In the exemplary first form of the invention illustrated, the auxiliary attachment apparatus 20 comprises framework means, such as is generally designated at 24, which includes a structurally strong member (or plurality of members) 26 having a rear lower end, which might be termed a rear end engagement portion 28, and having an upper forward end, which might be termed a forward or front end engagement portion 30.

The rear engagement end 28 of the framework structural member 26 is effectively provided with a pair of quick connect and disconnect positive locking engagement means, such as generally designated at 32, adapted to be positively engaged and rigidly connected with respect to corresponding lower parts of front frame portions 34 of the wheel chair, generally designated at 22, whereby to provide a rigid, structurally strong, and yet non-interfering connection between said wheel chair frame portions 34 and said auxiliary attachment framework means structural member 26.

In the exemplary first form of the invention illustrated, the above is accomplished by providing an additional transversely directed structural member 36 which is connected to each of said pair of quick connect and disconnect positive locking engagement means 32, and extends transversely and horizontally therebetween in a manner which causes it to effectively act as an auxiliary wheel chair frame structural member supplementing the pre-existing wheel chair frame 34 and rigidly interconnecting the laterally spaced side-positioned arm rest supporting portions thereof at the bottom thereof. However, it should also be noted that said transversely directed structural member 36 is also a part of the rear end engagement portion or means of the auxiliary attachment framework means 20 for connecting the structural framework member 26 thereof in a rigid and structurally strong manner with respect to the wheel chair frame front arm rest supporting portions 34.

It should be noted that in the preferred exemplary form of the invention illustrated, the auxiliary framework structural member 26 is effectively connected between the lower rear end 28 thereof and the upper forward end 30 thereof in a manner which would normally be referred to as either downwardly, rearwardly angularly directed or upwardly forwardly angularly directed, but which, while in effect being so connected, actually follows a curved, upwardly concave or downwardly convex path between said two locations so as to cause all portions of said structural member 26 to be completely out of the normal foot movement region of a patient sitting in the wheel chair 22 so that he will not be likely to strike the structural member 26 with his foot or to trip thereover during entry into or exit from the wheel chair 22.

In the exemplary first form of the invention illustrated, the lower end of the auxiliary framework structural member 26 is normally rigidly connected with respect to said transversely directed member 36 at substantially the center thereof by way of a welded-on or otherwise rigidly attached connection portion 38 which has its forward end rigidly connected to one member 39 of the rotative bearing means, generally designated at 40, and which has a second element 41 thereof rigidly connected to the lower rear end of said framework structural member 26. The arrangement is such that said bearing means 40 allows relative rotation of the auxiliary framework structural member 26 with respect to the transverse framework structural portion 36 around a vertical axis when said bearing means 40, which may be said to comprise a first pivot means, is free for rotation. However, normally, when the apparatus is in the operative relationship shown in FIGS. 1–7, said pivot means 40 is effectively overridden, immobilized, and/or locked by the locking and/or immobilizing means, generally designated at 42, and which comprises a pair of relatively arcuately movable upper and lower plates 44 and 46, one of which is rigidly attached to the portion 39 of the bearing means 40 (or to the connection member 38), and the other of which is rigidly attached to the other element 41 of the bearing means 40 (or to the framework structural member 26). Said plates 44 and 46 are provided with an alignable pair of holes 48 and 50 and a tensile-member-mounted captive locking pin 52 which may be dropped therethrough when the pivot means 40 is to be effectively immobilized, overridden, and locked against rotation, which is the condition when the apparatus is fully assembled in operative relationship as shown in FIGS. 1–7.

The purpose of the first pivot means 40 and the generally similar second pivot means 54 positioned at the rear side of the transverse structural member 36 will be explained hereinafter.

The forward or front upper end engagement portion 30 of the auxiliary framework structural member 26 is provided with a rotative journal or bearing means, indicated generally at 56, which includes an outer sleeve means 58 rotatively mounting therein a longitudinally captive but rotatively free portion 60 of an upwardly directed steering post member, indicated generally at 62, which is provided at the lower end thereof with a laterally split, bifurcated wheel-mounting yoke 64 which rotatively mounts between the separated portions of the yoke 64 in a normally substantially vertically directed plane a front self-propelling and self-steering wheel, indicated generally at 66, which is shown as being of a type which might be referred to as a bicycle-type front wheel. The upper end of the steering post member 62 is provided with operating means, indicated generally at 68, for positively propelling the front wheel 66 and for also steering same.

In the example illustrated, the operating means 68 includes what might be termed a transversely directed crankshaft means 70 and a pair of oppositely positioned and usually oppositely offset hand-operable cranks 72 and means coupling the crankshaft means 70 with respect to power transmission apparatus, generally indicated at 74, which, in turn, is coupled to and is operable to power-rotate the front wheel 66.

In the example illustrated, said coupling means is generally indicated at 76, and includes the hub portion 78 and a first exteriorly toothed sprocket wheel 80 adapted to be driven thereby, a second exteriorly toothed and smaller sprocket wheel 82 effectively coupled with respect to the front wheel 66 by a hub or coupling means 84, and an interconnecting endless loop type of sprocket chain 86 in engagement with both the exterior teeth of the first sprocket wheel 80 and the second sprocket wheel 82.

In the exemplary first form of the invention illustrated, the arrangement is such that manual rotation of the crankshaft 70 in a clockwise direction as viewed in FIG. 1, as a result of the application of manual force to the crank handles 72 by a patient sitting in the wheel chair 22, will apply forward movement producing torque to the front wheel 66 and effectively forwardly propel the complete structure shown in FIGS. 1–3.

It will also be apparent from a careful consideration of FIG. 3 that the crank handles 72 are spaced sufficiently far apart in a transverse or lateral direction to provide for the application of torque therethrough to the steering post member 62 around the upwardly directed axis thereof in a manner which will effectively rotate both the steering post member 62 and the front wheel 66 in a manner providing positive steering control of the complete composite vehicle shown in FIGS. 1–3.

In the exemplary first form of the invention illustrated, the coupling means, indicated generally at 76, and, in particular, the upper hub 78 or the lower hub 84 may be provided with or effectively comprise a combination one-way power transmission means and brake means operable to provide the positive transmission of torque therethrough in the forward movement producing manner previously described, but operable upon cessation of forward forcible cranking movement manually applied to the crank handles 72, to allow a free-wheeling disassociation of disconnection at some point in the power transmission train so that the front wheel 66 will be in a free-wheeling or coasting condition. This may be effected by merely holding the pair of crank handles 72 in a neutral or coasting position, and this will allow the composite vehicle to coast in a desired direction or to be moved by exterior force applied thereto, or, in the event that the wheel chair 22 is of a motor-powered type, this will allow the attachment apparatus 20 to function primarily as a steering apparatus with the propelling power coming from the motor associated with such a powered wheel chair. Also, said novel combination one-way power transmission and brake means, just referred to, may be of a type such that the reverse application of torque to the crankshaft 70 by reversing the direction of force manually applied to the crank handles 72, will effectively brake and frictionally lock the front wheel 66. The detailed interior construction of such a unidirectional coupling means is not shown since any of a variety of different well-known types may be employed for this purpose and since the invention does not lie in the well-known interior details of such prior art constructions, but rather in its cooperative relationship with respect to the remainder of the apparatus of the present invention.

In the exemplary first form of the invention illustrated, each of the previously mentioned pair of quick connect and disconnect positive locking engagement means, indicated generally at 32, may take any of several forms, but one exemplary form thereof is illustrated in FIG. 5 wherein it comprises a pair of rotatively interconnected half-round clamp members 86 effectively relatively pivotally interconnected at 88 and having attachment ends 90 adapted to be very quickly fastened together by exteriorly threaded finger-operable bolt means 92, and interiorly threaded nut means 94 which is preferably permanently attached to the corresponding one of said attachment ends 90, although in lieu thereof said apertured attachment end may be interiorly threaded itself. The type of quick connect and disconnect positive locking engagement means illustrated at 32 allows the very quick connection thereof around the corresponding front upstanding frame portion 34 of the wheel chair 22 at a lower part of each side thereof when the transverse structural member 36 is to be initially mounted thereon and allows it to be removed just as easily. However, it will be noted that the connection is extremely structurally strong.

The previously mentioned second pivot means 54 is provided in said transverse structural member 36 and comprise a bearing means of the same type of construction as the previously described first pivot means, indicated generally at 40, and is adapted to normally maintain said transverse structural member 36 in a transversely rigid condition when the device is in mounted operative relationship. However, it is adapted to be unlocked and rendered freely pivotal when the entire composite apparatus is intended to be collapsed into the folded, small space volume relationship shown in FIG. 8 for easy portability and/or storage.

Said second pivot means 54 includes locking and/or immobilizing means 98, generally similar to the corresponding first locking and immobilizing means, indicated generally at 42 and previously described. Said second locking and immobilizing means 98 comprise a pair of relatively arcuately movable upper and lower plates 100 and 102, one of which is rigidly attached to one portion 96 of the bearing means 54, which is also attached to the structural member 36 and the other of which is rigidly attached to a separate portion 97 of the bearing means 54, which is also attached to a separate portion of said structural member 36.

Said plates 100 and 102 are provided with an alignable pair of holes 104 and 106 and a tensile-member-mounted captive locking pin 108 which may be dropped therethrough when the pivot means 54 is to be effectively immobilized, overridden, and locked against rotation, which is the condition when the apparatus is fully assembled in operative relationship as shown in FIGS. 1–7.

The first and second pivot means 40 and 54 may be overridden and unlocked by removal of the corresponding locking pins 52 and 108, which then makes it possible to fold the entire composite apparatus into the collapsed relationship best shown in FIG. 8. Of course, the folding of the wheel chair 22 itself is made possible by the X frame 110, which is the only portion thereof interconnecting the two side frame parts 34 since the seat 112 and the back 114 are flexible and foldable. This foldable construction of the wheel chair 22 itself is well known in the art and, therefore, will not be described in detail herein.

It will be understood that the folded, collapsed relationship of the composite apparatus shown in FIG. 8 greatly facilitates the storage and movement of the entire device from one location to another by means other than the self-propelling of same and that the structural features making possible this easy folding and collapsing also make it possible to quickly expand and pivotally move the various portions of the collapsed, folded apparatus of FIG. 8 back into the fully assembled, operative relationship shown in FIGS. 1–7 with a minimum of time and effort.

FIG. 9 merely illustrates fragmentarily a very slight modification of the transverse structural member 36 of the first form of the invention, which is generally designated by the reference numeral 36a in this modification, and which is length-adjustable by reason of being of telescopic construction in the FIG. 9 modification. This makes it possible to adjust the transverse distance between the quick connect and disconnect positive locking engagement means, such as the two shown at 32 in the first form of the invention, for engagement with upstanding side frame portions of different makes of wheel chairs where different transverse spacings exist between the side frame portions thereof. In other words, the FIG. 9 modification merely makes the device size-adjustable for mounting cooperation with different sizes of wheel chairs, and it shows the transverse structural member 36a as comprising a sleeve 116 slidably mounting two transverse members 118 which are effectively keyed thereinto in relatively non-rotatable manners such as by being square, or of splined construction or the like, whereby to provide the requisite rotational immobility to the modified transverse member 36a of FIG. 9 around a transverse central axis thereof. The over-all extension or retraction thereof can be adjusted at will and locked by the locking thumb or set screws 120, although various other locking means may be employed in lieu thereof.

FIG. 10 merely illustrates fragmentarily a modification of the auxiliary structural framework means 24 of the first form of the invention which is generally designated by the reference numeral 24b in the FIG. 10 modification wherein it is shown as comprising a plurality of tubular members 26b arranged in spacedly positioned relationship for the purpose of increasing the structural strength thereof. However, it should be noted that numerous different structurally strong arrangements comprising modifications of the showing at 26 in FIG. 1 or the showing at 26b in FIG. 10 may be provided, and all such modifications are intended to be included and comprehended within the broad scope of the present invention since they merely relate to advantageous structural arrangements which are not basically new in inventive concept.

FIG. 11 illustrates a very slight modification of the invention fragmentarily, and similar parts are indicated by similar reference numerals, followed by the letter "c," however. In this modification, an auxiliary rigidifying structural framework member 112 is provided and is pivotally connected at 124 to the steering post bearing means 56c and is provided at its rear end with a quick connect and disconnect positive engagement and locking means 32c which may be of the type generally indicated at 32 in the first form of the invention, or which may be of any substantially functionally equivalent type. It will be noted that this auxiliary structural member 122 is provided primarily for providing both lateral and vertical rigidity to the auxiliary framework means 20c and that because of this, the rest of the structure thereof may be of less heavy and structurally strong material than is necessary in the first form of the invention. It should be clearly noted that this auxiliary rigidifying framework structure member 122 only closes off the side access opening to the wheel chair at one side of the front thereof, leaving the other side fully open for entry and exit of a patient. Also, it should be noted that it can be quickly pivotally opened, if desired, by merely releasing the quick connect and disconnect positive engagement means 32c.

FIG. 12 is a view similar to FIG. 11 and, therefore, similar parts are designated by similar reference numerals, followed by the letter "d," however. The only change in this modification from that shown in FIG. 11 is the fact that in FIG. 12 the auxiliary rigidifying structural framework member 122d is now positioned at the right side of the composite device rather than at the left side thereof. However, it operates in substantially the same manner as that described in connection with the FIG. 11 variant of the invention.

FIG. 13 is a view which merely comprises a combination of the FIG. 11 and FIG. 12 modifications, and all old portions of the invention are designated by the same reference numeral as originally employed, followed by the letter "e," however. However, since there are two of the auxiliary rigidifying structural framework members in this modification, the left one is designated by the reference numeral 122e while the right one is designated by the reference numeral 122e'. Otherwise, this modification of the invention functions substantially the same as the FIG. 11 or the FIG. 12 modifications referred to above except that they are combined in this modification, and it will, of course, be necessary in every case to open one or the other of the rigidifying structural members 122e or 122e' by disengaging corresponding quick connect and disconnect means 32e or 32e' and pivoting the entire member outwardly and forwardly sufficiently to allow easy exit and/or entry of a patient therethrough.

I claim:

1. A propelling and steering apparatus for a wheel chair, comprising: framework means having an upper forward end provided with and effectively comprising a front end engagement portion and having a rear lower end provided with and effectively comprising a rear end engagement portion, said front end engagement portion being provided with rotative bearing means including an outer sleeve means having an axial direction adapted to be upwardly directed when in operative position and being provided with and mounting in a longitudinally captive but rotatively free manner a longitudinal similarly directed steering post member, provided at a lower end thereof wtih a laterally split bifurcated wheel-mounted yoke means provided with and rotatively carrying therebetween in a normally substantially vertically directed plane a front wheel, said upper end of said steering post member being provided with a transversely directed rotatively mounted captive crankshaft means provided at each end with a hand-operable crank for manually applying torque thereto by the two hands of a person operating said cranks; and power transmission means effectively connected between said crankshaft means and said front wheel for driving same in response to torque applied to said crankshaft means by said cranks in a direction such as to cause forward rotation of said front wheel, said cranks carried by opposite ends of said crankshaft means being laterally spaced apart sufficiently to provide for the application of torque therethrough around the axis of said steering post member for effectively rotating same and causing turning rotation of said front wheel means in a corresponding direction; said framework means comprising at least one centrally positioned forward structural member extending downwardly and rearwardly and upwardly and forwardly in an effectively upwardly concave and downwardly convex manner between said front end engagement portion and said rear end engagement portion and lying in a substantially vertical central plane behind and substantially coplanar with respect to said steering post member whereby to provide maximum lateral clearance therebehind, said framework means also comprising a laterally substantially horizontally directed transverse structural member rigidly connected between corresponding lower frame parts of a wheel chair frame and substantially centrally and controllably rigidly connected to said rear end of said forward structural member of said framework means, said rear end engagement portion of said framework means effectively comprising a pair of rear end engagement portions at opposite ends of said transverse structural member of said framework means, with said pair of rear end engagement portions being provided with quick connect and disconnect positive locking engagement means adapted to be positively engaged and rigidly connected and locked with respect to corresponding front portions of a wheel chair frame whereby to provide a rigid structurally strong and yet non-interfering connection of said framework means, said front wheel, crankshaft, driving cranks, and power transmission means with respect to the front of a preexisting and initially separate wheel chair, in a manner making it possible for a person sitting in a wheel chair to manually propel and steer same, said centrally-positioned forward structural member of said framework means being provided adjacent to said rear end thereof and effectively between said rear end thereof and said transverse structural member with first pivot means free for rotation around a substantially vertically-directed first pivot axis and being effectively provided with controllably activatable first locking and immobilizing means for effectively overriding, immobilizing, and locking said first pivot means for rendering rigid the effective connection of said rear end of said forward structural member of said framework means with respect to said transverse structural member thereof and being controllably inactivatable for effectively removing the immobilizing and locking constraint thereof so as to allow said first pivot means to be freely rotatable around said substantially vertically directed first pivot axis, said transverse structural member of said framework means being provided adjacent to one end thereof wtih two normally effectively aligned transverse structural member parts and with second pivot means interconnected therebetween and free for rotation around a substantially vertically-directed second pivot axis and being effectively provided with controllably activatable second locking and immobilizing means for effectively overriding, immobilizing, and locking said second pivot means for rendering rigid the effective connection thereby of said transverse structural member parts and being controllably inactivatable for effectively removing the immobilizing and locking constraint thereof so as to allow said second pivot means to be freely rotatable around said substantially vertically-directed second pivot axis.

2. Apparatus as defined in claim 1, wherein said power transmission means comprises a pair of vertically spaced sprocket wheel means in the form of an upper sprocket wheel effectively coupled with respect to said crankshaft means and a lower sprocket wheel effectively coupled with respect to said front wheel, and interconnecting sprocket chain means in peripheral engagement with both of said sprocket wheel means.

3. Apparatus as defined in claim 2, including unidirectional coupling means effectively in a power transmission path of said power transmission means between said crankshaft means and said front wheel means and adapted to transmit power in directions of relative rotation thereof producing forward movement of the front wheel and adapted to allow free-wheeling effective power transmission disconnection therebetween when said crankshaft means is maintained in a neutral coasting position, and adapted to positively brake said front wheel when oppositely directed torque is manually applied to said crankshaft means.

4. Apparatus as defined in claim 1, including unidirectional coupling means effectively in a power transmission path of said power transmission means between said crankshaft means and said front wheel means and adapted to transmit power in directions of relative rotation thereof producing forward movement of the front wheel and adapted to allow free-wheeling effective power transmission disconnection therebetween when said crankshaft means is maintained in a neutral coasting position, and adapted to positively brake said front wheel when oppositely directed torque is manually applied to said crankshaft means.

References Cited

UNITED STATES PATENTS

| 327,979   | 10/1885 | La Casse  | 280—250   |
| 505,373   | 9/1893  | Sanford   | 280—250   |
| 2,633,896 | 4/1953  | Thompson  | 297—45    |
| 2,818,910 | 1/1958  | Hawkins   | 297—45    |
| 3,193,305 | 7/1965  | Hendricks | 280—250 X |
| 3,381,973 | 5/1968  | Carr      | 280—242   |

FOREIGN PATENTS

| 458,686   | 4/1913 | France.        |
| 529,233   | 5/1957 | Belgium.       |
| 1,044,078 | 9/1966 | Great Britain. |

KENNETH H. BETTS, Primary Examiner

U.S. Cl. X.R.

280—278; 297—45